(12) United States Patent
Elonsson

(10) Patent No.: US 9,543,680 B2
(45) Date of Patent: Jan. 10, 2017

(54) CONTACT ASSEMBLY OF A ROBOTIC GARDEN TOOL CHARGING DEVICE

(75) Inventor: Martin Elonsson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 82 days.

(21) Appl. No.: 14/366,907

(22) PCT Filed: Dec. 30, 2011

(86) PCT No.: PCT/SE2011/051609
§ 371 (c)(1),
(2), (4) Date: Jun. 19, 2014

(87) PCT Pub. No.: WO2013/100833
PCT Pub. Date: Jul. 4, 2013

(65) Prior Publication Data
US 2014/0327389 A1    Nov. 6, 2014

(51) Int. Cl.
*H01R 13/24* (2006.01)
*H02J 7/00* (2006.01)
(Continued)

(52) U.S. Cl.
CPC ............. *H01R 13/24* (2013.01); *A01D 34/001* (2013.01); *A01D 34/008* (2013.01);
(Continued)

(58) Field of Classification Search
CPC ..... A01D 34/001; H02J 7/0042; H02J 7/0052; H01R 13/24; Y10S 901/01
(Continued)

(56) References Cited

U.S. PATENT DOCUMENTS

| 6,525,509 B1 * | 2/2003 | Petersson ............... A47L 9/009 |
| | | 320/107 |
| 2004/0201361 A1 * | 10/2004 | Koh ...................... H02J 7/0042 |
| | | 320/104 |

(Continued)

FOREIGN PATENT DOCUMENTS

| DE | 29824813 U1 | 10/2002 |
| EP | 2082638 A1 | 7/2009 |

(Continued)

OTHER PUBLICATIONS

International Search Report and Written Opinion of International Patent Application No. PCT/SE2011/051609 mailed Sep. 4, 2012.
(Continued)

*Primary Examiner* — Sun Lin
(74) *Attorney, Agent, or Firm* — Nelson Mullins Riley & Scarborough LLP

(57) ABSTRACT

A contact assembly of a robotic garden tool charging device 10. The contact assembly 100 is arranged to engage a contact element 200 of a robotic garden tool 20 for a charging operation. The contact assembly 100 comprises a contact member 110 having a plurality of connection points 121, arranged to provide a plurality of points of contact 30 between the contact member 110 and the contact element 200. The contact member is configured to be pivotably and translatably connected to a body portion 11 of the charging device 10. The contact assembly 100 comprises a biasing member 140 arranged to interconnect the contact member 110 and the body portion 11, so as to bias the contact member 110 towards the contact element 200 during the charging operation.

15 Claims, 4 Drawing Sheets

(51) Int. Cl.
*A01D 34/00* (2006.01)
*H01R 13/631* (2006.01)

(52) U.S. Cl.
CPC ........ *H01R 13/6315* (2013.01); *H02J 7/0042* (2013.01); *H02J 7/0052* (2013.01); *H01R 2201/26* (2013.01); *Y10S 901/01* (2013.01)

(58) Field of Classification Search
USPC .......................................................... 320/107
See application file for complete search history.

(56) References Cited

U.S. PATENT DOCUMENTS

2005/0166352 A1\* 8/2005 Keppler ................. A47L 9/009
　　　　　　　　　　　　　　　　　　　　　　15/319
2012/0327573 A1\* 12/2012 Glauning ................ B25F 5/008
　　　　　　　　　　　　　　　　　　　　　　361/679.01
2013/0076304 A1\* 3/2013 Andersson ........... A01D 34/008
　　　　　　　　　　　　　　　　　　　　　　320/107

FOREIGN PATENT DOCUMENTS

| FR | 2828589 A1 | 2/2003 |
| JP | 2002158062 A | 5/2002 |
| KR | 100919765 B1 | 10/2009 |
| WO | 2005074362 A2 | 8/2005 |

OTHER PUBLICATIONS

Chapter I International Preliminary Report on Patentability of International Patent Application No. PCT/SE2011/051609 issued Jul. 1, 2014.

\* cited by examiner

CONTACT ASSEMBLY OF A ROBOTIC GARDEN TOOL CHARGING DEVICE

TECHNICAL FIELD

Embodiments herein relate to robotic garden tool charging devices. In particular, they relate to a contact assembly of a robotic garden tool charging device, which contact assembly is arranged to engage a charging contact of a robotic garden tool for a charging operation.

BACKGROUND

Robotic garden tools, such as robotic lawnmowers are well known.

A robotic lawn mower is generally driven by an internal power source such as a rechargeable battery. The robotic garden tool may be configured to autonomously move over a ground surface that is to be treated. Battery charging is performed when the robotic garden tool is docked to a charging device, to which the robotic garden tool will automatically return when required. During a battery charging operation, electric current will be transferred from the charging device to the battery via one or several charging contacts. A charging contact may comprise a first contact member provided on the charging device and a second contact member provided on the robotic garden tool. When the robotic garden tool is properly docked to the charging device, the first and second contact members are interconnected in one or several points of connection, so as to allow transfer of electric current via the points of connection.

However, since the robotic garden tool is configured to approach the charging device autonomously, and since the ground on which the charging device is positioned may be rough and/or inclined, the robotic garden tool may sometimes arrive to the charging device in a direction which is not aligned with the docking device and/or with a lateral displacement relative to the docking device. An angular and/or lateral displacement of the robotic garden tool relative to the charging device may also occur due to other reasons, such as an unfavorable position of the robotic garden tool when initiating its movement towards the charging station.

SUMMARY

In view of the discussion above, it is an object for embodiments herein to provide an arrangement making it possible to achieve an efficient charging operation also during non-ideal circumstances. An arrangement which is simple, robust and cost-efficient.

According to an aspect of the solution, the object is at least partially achieved by means of a contact assembly of a robotic garden tool charging device, which contact assembly is arranged to engage a contact element of a robotic garden tool for a charging operation. The contact assembly comprises a contact member having a plurality of connection points arranged to provide a plurality of points of contact between the contact member and the contact element. The contact member is configured to be pivotably and translatably connected to a body portion of the charging device. The contact assembly comprises a biasing member arranged to interconnect the contact member and the body portion, so as to bias the contact member towards the contact element during the charging operation.

Thereby, a contact assembly is provided which is adjustable, such that a plurality of connection points may be achieved between the contact assembly and the contact element of the robotic garden tool even if the robotic garden tool and the docking device are not properly aligned as the robotic garden tool docks with the charging device.

According to an embodiment the contact member comprises an elongate opening, arranged to receive a guide member of the body portion.

Thereby, a simple and robust arrangement for enabling allowing translating as well as rotating movement of the contact member relative to the body portion is achieved.

According to another embodiment the biasing member is a helical spring. Thereby, a simple, cost-efficient and robust biasing member is provided.

According to yet another embodiment the contact member comprises a mounting portion arranged to be connected to the body portion, and a contact portion comprising the connection points.

According to another embodiment, the contact portion is at least partially resilient. Thereby, even more flexibility is added to the contact assembly According to an embodiment the mounting portion and the contact portion are integrally formed. Thereby a simple and cost-efficient solution which is robust and easy to manufacture may be achieved.

According to another embodiment the contact member is made from sheet metal.

According to a second aspect of the solution, a robotic garden tool charging device is provided, which charging device comprises at least one contact assembly according to the first aspect of the solution. The benefits and advantages related to the second aspect of the solution correspond to the benefits and advantages of the first aspect.

BRIEF DESCRIPTION OF THE DRAWINGS

The invention will be understood and appreciated more fully from the following detailed description, taken in conjunction with the drawings, in which.

DESCRIPTION OF PREFERRED EMBODIMENTS

Figure 1:
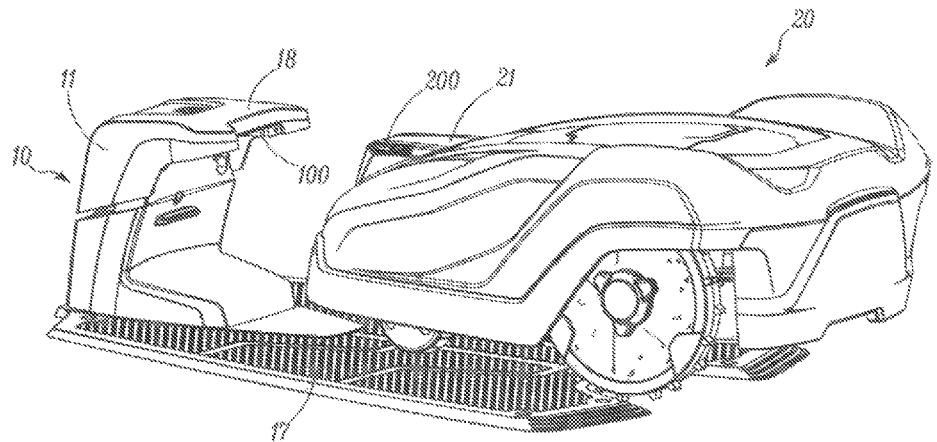
FIG. 1 is a perspective view of a robotic garden tool and a charging device.

Embodiments herein will be described more fully hereinafter with reference to the accompanying drawings. In the drawings, like numbers refer to like elements.

Figure 2:
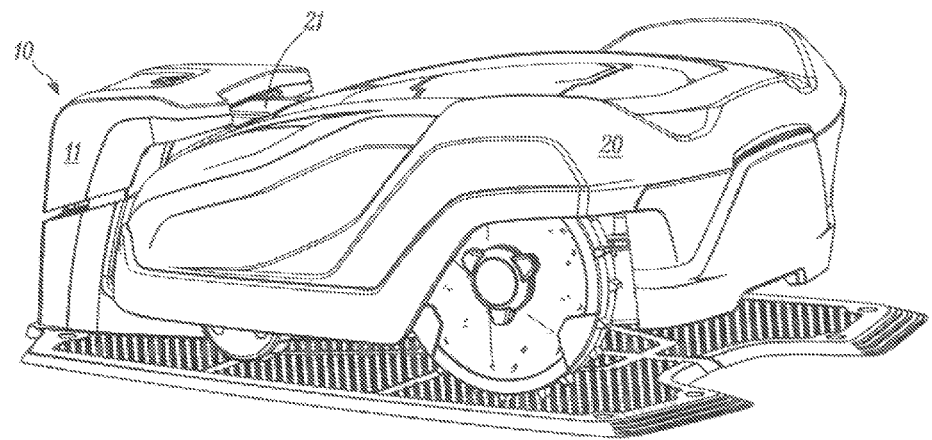
FIG. 2 is perspective view of the robotic garden tool and charging device shown in FIG. 1, in a docked state.

In FIGS. 1 and 2, a robotic garden tool 20 embodied as a robotic lawn mower 20 is shown. The robotic garden tool 20 is configured to move autonomously within a working area.

It is provided with an internal power supply, such as a battery. Recharging of the battery may be performed when the robotic garden tool is docked to a charging device 10. The robotic garden tool comprises one or several contact elements 200 which are electrically connected to the battery.

A purpose of a contact element 200 is to receive electric current from the charging device 10, and forward it to the battery, during a battery recharging procedure.

An exemplary charging device 10 is shown in FIGS. 1 and 2. The charging device 10 may be positioned within the working area or at its boundaries. The charging device 10 may be linked by an electrical cable to a power supply such as a mains outlet. As the robotic garden tool 20 moves within the working area, the charging level of the battery will decrease. The robotic garden tool may be configured so as to automatically return to the charging device when the charging level of the battery falls below a predetermined threshold value.

The robotic garden tool 20 will then navigate towards, and dock to, the charging device 10, such that electric power may be supplied from the power supply, to the battery of the robotic garden tool, via the charging device.

There may also be other reasons for the robotic garden tool 20 to return to the charging device 10. As an example, an operator may manually prompt the robotic garden tool to return to the charging device by means of activating an input device provided on the robotic garden tool.

When the robotic garden tool 10 has docked to the charging device 20, one or several contact members 110 on the charging device engage with corresponding contact elements 200 on the robotic garden tool 20.

In FIG. 2, the robotic garden tool is shown in a docked state.

When a contact member 110 is connected to a contact element 200, flow of electric current from the power supply to the battery is enabled, since the contact member 110 is connected to the power supply and the contact element 200 is electrically connected to the battery.

The contact element 200 may e.g. be a charging plate 200 or a charging rod 200. It is desirable that a plurality of points of contact 30 is achieved between a contact member 110 and its corresponding contact element 200 when the robotic garden tool 20 is docked to the charging device 10 for a battery recharging operation. A plurality of points of contact 30 may facilitate efficient transfer of electric current between the contact member 110 and the contact element 200. Furthermore a plurality of points of contact 30 may provide an arrangement which is less sensitive to corrosion and/or dirt present between a contact member 110 and its corresponding contact element 200 as compared to an arrangement in which only one point of contact is provided between a contact member 110 and its corresponding contact element 200.

The charging device 10 may comprise a base plate, 17 and a body portion 11. The charging device may be configured so as to define a space arranged to receive a portion of the robotic garden tool, during a charging state, as shown in FIG. 2.

The body portion 11 of the charging device 10 may comprise top portion 18 protruding from a rear portion of the body portion 11 in a longitudinal direction Y of the charging device 10. When the robotic garden tool is docked to the charging device, the top portion 18 will be positioned above a portion of the robotic garden tool 20.

On a downwardly facing side of this top portion 18 a passage 19 is formed, which passage 19 is arranged to receive a contact element accommodating portion 21 of the robotic garden tool 200.

Figure 6:
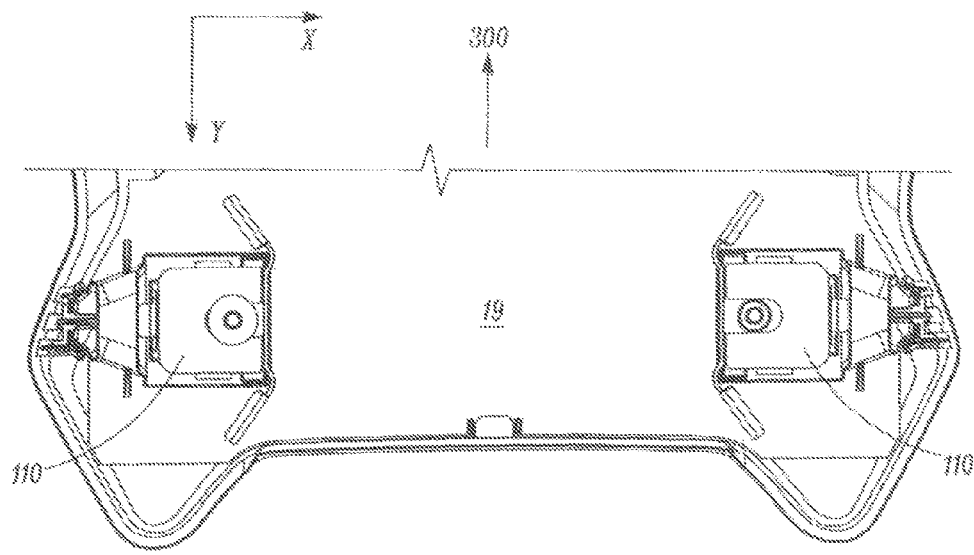
FIG. 6 is a plan bottom view of a portion of the charging device of FIGS. 1 and 2.

FIG. 6 is a partial bottom plan view of the top portion 18 shown in FIGS. 1 and 2. In the embodiment shown in FIG. 6, two contact members 110, provided on opposite sides of the passage 19 define the side borders of the passage 19.

The passage defines a preferred docking direction 300 which in the embodiments shown in the drawings correspond to a longitudinal direction Y of the docking device.

According to an embodiment, the robotic garden tool 20 has two contact elements 200, provided on opposite sides of a contact element accommodating portion 21 of the robotic garden tool 200. Each contact element 200 has a contact surface 201 which is arranged to engage with a corresponding contact member 110 on the charging device 10 Most of the robotic garden tool is omitted in FIGS. 7-9, in order to elucidate the docking procedure. Only the contact elements 200 and a part of the contact element accommodating portion 21 are shown.

When the robotic garden tool 20 returns to the charging device 10, it may have a direction of movement which does not coincide with the preferred docking direction 300.

Arrangements may be provided in order to align the robotic garden tool 20 with the charging device 10 prior to docking. As an example the base plate 17 of the charging device may be provided with guide wires configured to assist in alignment of the robotic garden tool. There may nevertheless be a discrepancy between the direction of movement of the robotic garden tool 20 and the preferred docking direction 300 as the robotic garden tool 20 reaches the charging device 10, resulting in an angular displacement a of a contact element 200 relative to the preferred docking direction 300 and relative to a contact member 110 which the contact element 200 is configured to engage with.

When arriving to the charging device, the robotic garden tool 20 may also be displaced in a lateral direction relative to the charging device 10, such that a contact element is laterally displaced relative to its corresponding contact member. In FIG. 6, the lateral direction of the charging device 10 is the X direction.

In order to maintain several points of contact 30 between a contact element and its corresponding contact member 110 even if there is a lateral and/or an angular displacement of the robotic garden tool relative to the preferred direction and position, a contact assembly 100 can be configured according to embodiments herein.

Figure 4:
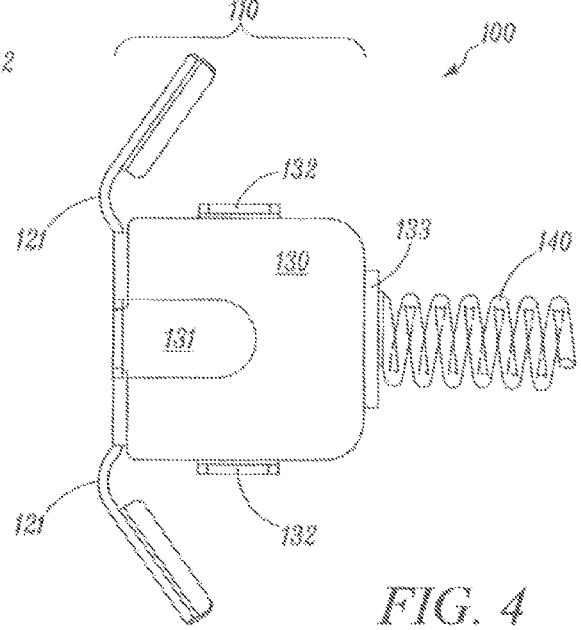
FIG. 4 is a plan view of a contact assembly comprising a contact member and a biasing member.

As shown in FIG. 4, a contact assembly 100 according to embodiments herein comprises a contact member 110 and a biasing member 140.

Figure 3:
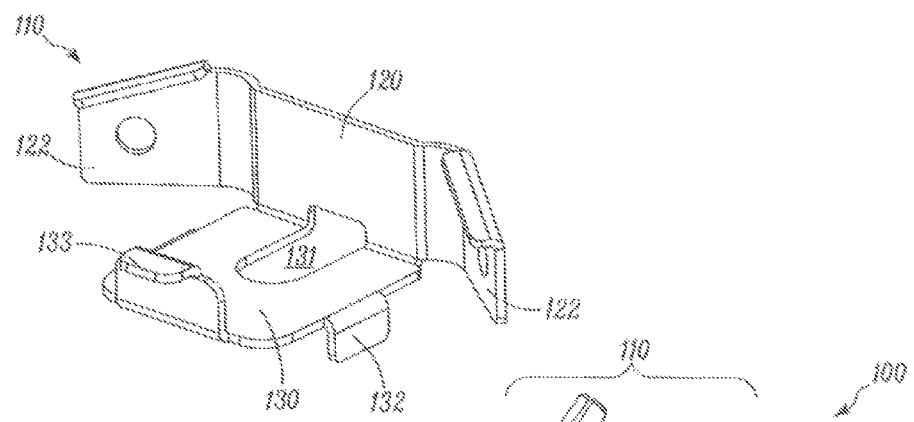
FIG. 3 is a perspective view of a contact member of a contact assembly.

In FIG. 3, an exemplary contact member 110 is shown in detail. According to an embodiment, the contact member 110 has a mounting portion 130 and a contact element engaging portion 120.

The biasing member 140 may be a spring 140. In the exemplary embodiment shown in FIG. 4, the biasing member is a helical spring 140.

Figure 5:
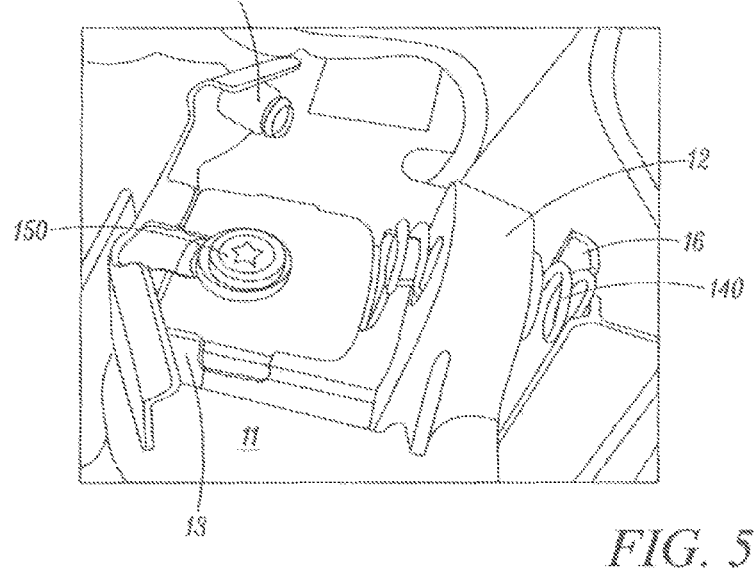
FIG. 5 is a perspective view of a contact assembly which is connected to a body portion of a charging device.

The contact member shown in FIGS. 3-5 comprises a biasing member receiving portion 133 of the contact member 110, which biasing member receiving portion 133 is arranged to receive a first end of a biasing member 140. A second end of the biasing member 140 is arranged to be connected to a second biasing member receiving portion 16 defined in a top portion 18 of the of the charging device body portion 11.

An elongate opening 131 may be provided in the contact portion 130 of the contact member 110. The elongate opening 131 is arranged to receive a guide pin 150 extending from the body portion 11.

The connection arrangement defined by the guide pin 150 and the elongate opening 131 allows the contact member 110 to both translate and rotate relative to the body portion 11 of the charging device 10.

According to embodiments herein, the contact member 110 comprises at least two connection points 121, arranged to provide a plurality of points of contact 30 between the contact member 110 and its corresponding contact element 200.

According to the embodiment shown in FIGS. 3-5, the connection points are defined by protruding portions 121 provided on the contact element engaging portion 120.

The contact element engaging portion may also comprise wings 122, arranged to engage and guide a contact element 200, in a beginning of a docking procedure.

In the embodiment shown in FIG. 5, one of the wings 122 of a contact element engaging portion 120 is arranged to receive a power supply connection 125 of the charging device.

A maximal translational movement of the contact member may be defined by the shape of the elongate opening 131.

According to an embodiment, the contact member 110 comprises stopper portions 132 arranged to abut on stopper portions 13 provided in the charging device body portion, so as to delimit a movement of the contact member in a first direction.

The contact member 110 may rotate about a pivot axis defined by one of the stopper portions 132 when that stopper portion 132 abuts on a corresponding stopper portion 13 provided in the charging device body portion 11, or when the stopper portion 132 abuts on another portion of the charging device body portion 11. When none of the stopper portions 132 of the contact member abuts on a portion of the charging device body portion, the axis of rotation of the contact member 110 may be defined by the guide pin 150.

When the contact element engaging portion 120 is created by means of folding a portion of the contact member 110, the contact element engaging portion 120 may be used to delimit a movement of the contact member in a second direction which is opposite to the first direction.

When the contact member rotates relative to the body portion 11, the end of the biasing member 140 which is connected to the contact member 110 will rotate with the contact member 110, such that the extension direction of the biasing member will deviate from a resting direction of the biasing member 140. The body portion 11 may comprise a biasing member accommodating channel 12 or passage 12, arranged to delimit a rotation of the biasing member 140.

Figure 7:
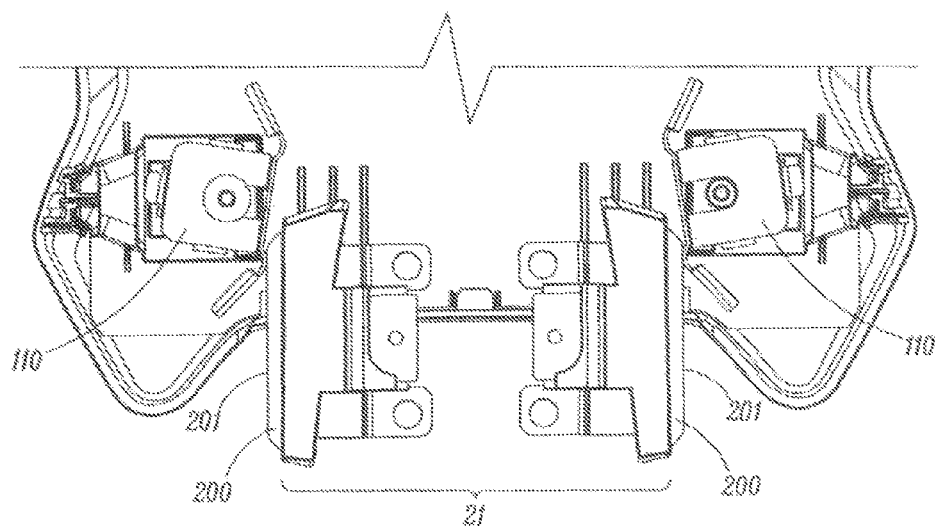
FIG. 7 shows the portion of FIG. 6, and a portion of a robotic garden tool, in a partly docked state.
Figure 8:
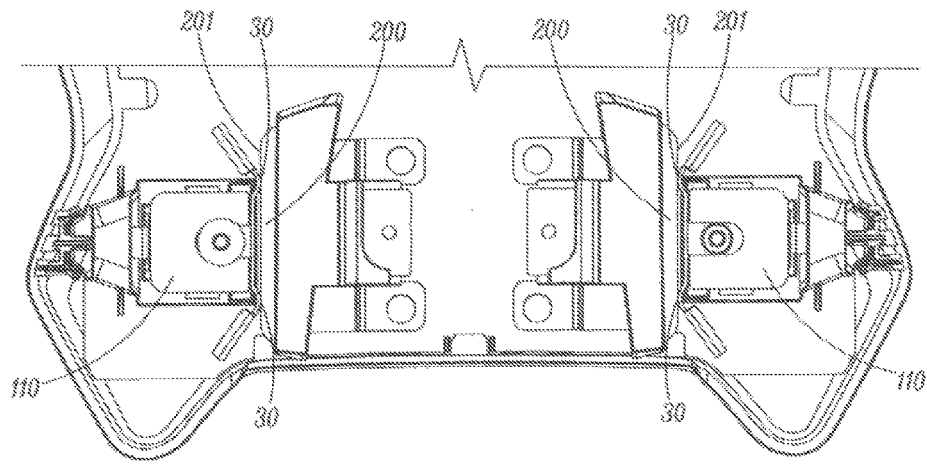
FIG. 8 is a plan view according to FIGS. 6-7, disclosing a completely docked state when the robotic garden tool is properly aligned with the charging device.
Figure 9:
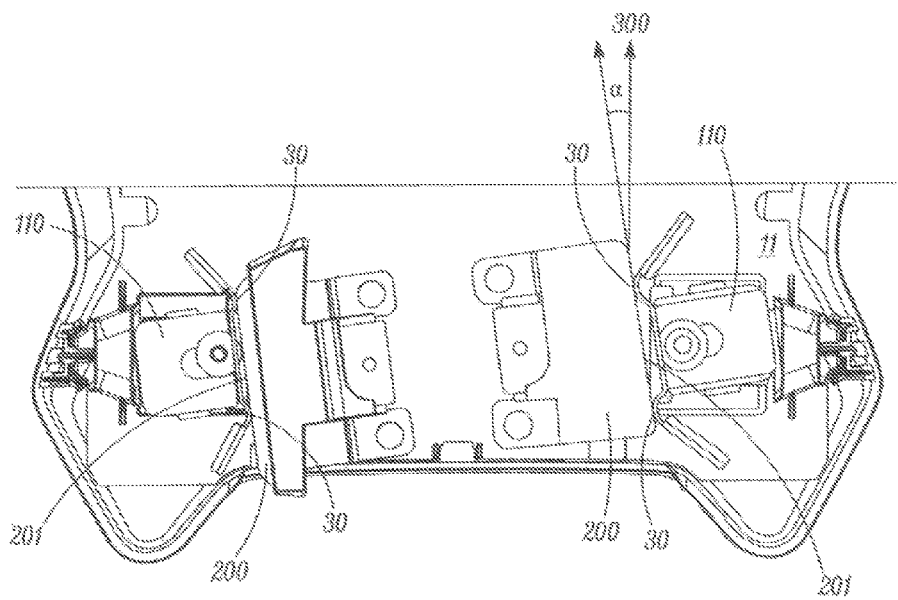
FIG. 9 is a plan view according to FIGS. 6-7, disclosing a completely docked state when the robotic garden tool is not perfectly aligned with the charging device.

FIGS. 6-9 illustrate different states of a docking procedure. In FIGS. 6-9, the biasing member 140 of the charging assembly 100 is omitted. In FIGS. 7-9, only a contact element accommodating portion 21 of the robotic garden tool 20 is schematically shown, so as to illustrate the docking procedure.

FIG. 6 illustrates a state in which no robotic garden tool 20 is present in the charging device 10, a non-docked state.

FIG. 7 illustrates a state in which the docking procedure is initiated but not completed. FIG. 7 shows a situation in which the robotic garden tool 20 is aligned with the charging device 10, such that the each of the two contact elements 200 provided on the contact element accommodating portion 21 are aligned with their respective corresponding contact member 110.

As can be seen in FIG. 7 the contact element is slightly rotated during this initial state of docking, since the contact element exerts a force only on one of the two connection points 121 in this state. However, the contact element will return to the extension direction shown in FIG. 8 when the contact element accommodating portion is fully inserted into the passage 19, such that the contact element engages both connection points 121 of the contact member 110.

Thanks to the biasing member 140 and the translation enabling connection arrangement defined by the guide pin 150 and the elongate opening 131, the lateral position of a contact member may be different in a docked state as compared to a non-docked state. This situation will also occur if the robotic garden tool is laterally displaced relative to the charging device, but arrives to the charging device in a direction which is parallel to the preferred docking direction 300. In the embodiment shown in FIGS. 6-9, with two contact assemblies 100, this means that one of the biasing members 140 provided on the charging device 10 will be more compressed than the other.

FIG. 9 illustrates a completely docked state in a situation when the robotic garden tool is not aligned with the charging device 10. Thanks to the above described configuration of the contact assembly, a plurality of points of contact 30 between the contact member 110 and the contact element 200 may be achieved also in this case. When the contact element 200 reaches the contact member 110, in order to initiate a docking procedure, the contact member may in this case both rotate and translate, so as to adapt to an angular displacement of the contact element relative to a body portion of the charging device 10.

When the docking procedure is completed, the contact member may, in a case of angular displacement of the robotic garden tool 20, stay in a rotated position, as shown in FIG. 9.

According to an embodiment, the contact element engaging portion 120 may comprise a row of at least two resilient contact bars, to provide multiple contact points between the contact member 110 and the contact element 200.

The embodiments herein are not limited to the above described embodiments. Various alternatives, modifications and equivalents may be used. Therefore, the above embodiments should not be taken as limiting the scope of the invention, which is defined by the appending claims.

The invention claimed is:

1. A contact assembly of a robotic garden tool charging device, the contact assembly being arranged to engage a contact element of a robotic garden tool for a charging operation, wherein the contact assembly comprises a contact member having a plurality of connection points, arranged to provide a plurality of points of contact between the contact member and the contact element, wherein the contact member is configured to be pivotably and translatably connected to a body portion of the charging device, and wherein the contact assembly comprises a biasing member arranged to interconnect the contact member and the body portion, so as to bias the contact member towards the contact element during the charging operation.

2. The contact assembly according to claim 1, wherein the contact member comprises an elongate opening arranged to receive a guide member of the body portion.

3. The contact assembly according to claim 1, wherein the biasing member is a helical spring.

4. The contact assembly according to claim 1, wherein the contact member comprises a mounting portion arranged to be connected to the body portion, and a contact portion comprising the connection points.

5. The contact assembly according to claim 4, wherein the contact portion is at least partially resilient.

6. The contact assembly according to claim 4, wherein the mounting portion and the contact portion are integrally formed.

7. The contact assembly according to claim 1, wherein the contact member is made from sheet metal.

8. A robotic garden tool charging device comprising at least one contact assembly, the at least one contact assembly being arranged to engage a contact element of a robotic garden tool for a charging operation, wherein the at least one contact assembly comprises a contact member having a plurality of connection points, arranged to provide a plurality of points of contact between the contact member and the contact element, wherein the contact member is configured to be pivotably and translatably connected to a body portion of the charging device, and wherein the at least one contact assembly comprises a biasing member arranged to interconnect the contact member and the body portion, so as to bias the contact member towards the contact element during the charging operation.

9. The robotic garden tool charging device according to claim 8, the robotic garden tool charging device comprising two contact assemblies.

10. The robotic garden tool charging device according to claim 8, wherein the contact member comprises an elongate opening arranged to receive a guide member of the body portion.

11. The robotic garden tool charging device according to claim 8, wherein the biasing member is a helical spring.

12. The robotic garden tool charging device according to claim 8, wherein the contact member comprises a mounting portion arranged to be connected to the body portion, and a contact portion comprising the connection points.

13. The robotic garden tool charging device according to claim 12, wherein the contact portion is at least partially resilient.

14. The robotic garden tool charging device according to claim 12, wherein the mounting portion and the contact portion are integrally formed.

15. The robotic garden tool charging device according to claim 8, wherein the contact member is made from sheet metal.

* * * * *